United States Patent
Schaefer

(10) Patent No.: US 10,832,385 B2
(45) Date of Patent: Nov. 10, 2020

(54) METHOD AND DEVICE FOR DETERMINING THE POSITION OF AN OPTICAL BOUNDARY SURFACE ALONG A FIRST DIRECTION

(71) Applicant: Carl Zeiss Microscopy GmbH, Jena (DE)

(72) Inventor: Lutz Schaefer, Kitchener (CA)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 15/650,837

(22) Filed: Jul. 14, 2017

(65) Prior Publication Data
US 2018/0018758 A1  Jan. 18, 2018

(30) Foreign Application Priority Data

Jul. 15, 2016 (DE) .................. 10 2016 113 068

(51) Int. Cl.
*G06T 5/00* (2006.01)
*G02B 21/24* (2006.01)
(Continued)

(52) U.S. Cl.
CPC ............ *G06T 5/003* (2013.01); *G02B 21/006* (2013.01); *G02B 21/244* (2013.01); *G06T 5/001* (2013.01);
(Continued)

(58) Field of Classification Search
CPC .......... G06T 5/003; G06T 7/70; G06T 5/001; G06T 5/006; G06T 2207/20056; G06T 2207/10056; G02B 21/244; G02B 21/006
See application file for complete search history.

(56) References Cited

U.S. PATENT DOCUMENTS

| | | | | |
|---|---|---|---|---|
| 5,808,742 A | * | 9/1998 | Everett | ............... G03F 9/70 356/401 |
| 5,982,489 A | * | 11/1999 | Shiraishi | ............... G01B 11/22 356/484 |

(Continued)

FOREIGN PATENT DOCUMENTS

GB  2387728 A  * 10/2003  ............... G06T 5/10

OTHER PUBLICATIONS

Gibson & Lanni, "Experimental test of an analytical model of aberration in an oil-immersion objective lens used in three-dimensional light microscopy", J. Opt. Soc. Am. A/vol. 9, No. 1, 154 ff, Jan. 1992, 13 pages.

(Continued)

*Primary Examiner* — John W Lee
(74) *Attorney, Agent, or Firm* — Skaar Ulbrich Macari, P.A.

(57) ABSTRACT

A method for determining the position of an optical boundary surface along a first direction includes a) imaging a pattern in a plane transverse to the first direction, and recording a two-dimensional image of the pattern imaged in the plane; b) repeating step a) for different positions in the first direction, wherein the different positions cover an area in the first direction in which the optical boundary surface lies; c) averaging each image from step a) along a direction transverse to the second direction such that in each case a one-dimensional data set is produced; d) transforming each data set from step c) into a frequency domain; e) determining the frequency of the greatest amplitude of all data sets transformed in step d); and f) determining the position along the first direction by evaluating the data sets transformed in step d) at the frequency determined in step e).

15 Claims, 2 Drawing Sheets

(51) Int. Cl.
*G06T 7/70* (2017.01)
*G02B 21/00* (2006.01)

(52) U.S. Cl.
CPC ............... *G06T 5/006* (2013.01); *G06T 7/70* (2017.01); *G06T 2207/10056* (2013.01); *G06T 2207/20056* (2013.01)

(56) References Cited

U.S. PATENT DOCUMENTS

| | | | | |
|---|---|---|---|---|
| 7,019,845 | B1* | 3/2006 | Leary | G01N 21/211 356/502 |
| 7,315,372 | B1* | 1/2008 | Billard | G01N 15/1434 356/338 |
| 9,223,021 | B2* | 12/2015 | Goldman | G01S 3/8006 |
| 2002/0009221 | A1* | 1/2002 | Hercke | G01B 21/30 382/152 |
| 2004/0004659 | A1* | 1/2004 | Foote | H04N 5/268 348/36 |
| 2005/0209779 | A1* | 9/2005 | Busko | G06T 5/002 702/1 |
| 2005/0219461 | A1* | 10/2005 | Hirohara | A61B 3/032 351/205 |
| 2005/0223970 | A1* | 10/2005 | Taniguchi | B23K 26/073 117/200 |
| 2005/0259265 | A1* | 11/2005 | De Lega | G01B 9/02058 356/497 |
| 2008/0292135 | A1* | 11/2008 | Schafer | G06T 7/521 382/100 |
| 2009/0022401 | A1* | 1/2009 | Huang | G06T 5/002 382/190 |
| 2009/0237501 | A1* | 9/2009 | Lemmer | G02B 21/0076 348/79 |
| 2010/0033811 | A1 | 2/2010 | Westphal et al. | |
| 2010/0294749 | A1* | 11/2010 | Kempe | G02B 21/245 219/121.72 |
| 2012/0253170 | A1* | 10/2012 | Kim | G06T 7/149 600/410 |
| 2013/0335747 | A1* | 12/2013 | Haitjema | G01N 21/45 356/503 |
| 2014/0112103 | A1* | 4/2014 | Goldman | G01S 3/8006 367/118 |
| 2015/0043805 | A1* | 2/2015 | Sakamoto | G06K 9/52 382/151 |
| 2015/0309297 | A1 | 10/2015 | Westphal et al. | |
| 2016/0048967 | A1 | 2/2016 | Mitzkus et al. | |

OTHER PUBLICATIONS

L.H. Schaefer & D. Schuster, "Structured Illumination Microscopy: Improved Spatial Resolution using Regularized Inverse Filtering", 2000, 1 page.

Gilbert Strang, "Computational Science and Engineering", Massachusetts Institute of Technology, 229-244, (2007), 17 pages.

* cited by examiner

METHOD AND DEVICE FOR DETERMINING THE POSITION OF AN OPTICAL BOUNDARY SURFACE ALONG A FIRST DIRECTION

PRIORITY

This application claims the benefit of German Patent Application No. 102016113068.0, filed on Jul. 15, 2016, which is hereby incorporated herein by reference in its entirety.

FIELD

The present invention relates generally to microscopy, and more particularly to a method and a device for determining the position of an optical boundary surface along a first direction.

BACKGROUND

Methods with structured illumination are known in microscopy for determining the position of an optical boundary surface. As is described e.g. in US 2008/0292135 A1, the contrast of the grating pattern imaged on the boundary surface and detected with the camera depends on the axial position, with the result that the axial position of the boundary surface can be determined. Various forms of derivation are used to determine the contrast function from the recorded image data. A general disadvantage of derivations is their sensitivity to interferences such as e.g. noise and differences in illumination which are often found to an increased extent in the contrast function. Furthermore, a derivation of a contrast function obtained in this way is often used to find the position via the zero-crossings. However, it has been shown that such approaches are unstable and that additional filters and segmentations with parameters for adaptation usually have to be used to remedy them. The choice of these parameters is usually made empirically and is only effective in a limited scope of application, with the result that there is no robust method for determining the position of an optical boundary surface.

SUMMARY

An object of the invention to provide a method for determining the position of an optical boundary surface along a first direction with which the difficulties named above are overcome as completely as possible. Furthermore, a corresponding device for determining the position of the optical boundary surface along a first direction is disclosed.

The disclosure includes a method for determining the position of an optical boundary surface along a first direction in which the following steps are carried out:
 a) imaging a pattern in a plane transverse to the first direction, wherein the pattern varies periodically in the plane in a second direction, and recording a two-dimensional image of the pattern imaged in the plane,
 b) repeating step a) for different positions in the first direction, wherein the different positions cover an area in the first direction in which the optical boundary surface lies,
 c) averaging each image from step a) along a direction transverse (preferably perpendicular) to the second direction such that in each case a one-dimensional data set is produced,
 d) transforming each data set from step c) into a frequency domain,
 e) determining the frequency of the greatest amplitude of all data sets transformed in step d),
 f) determining the position along the first direction by evaluating the data sets transformed in step d) at the frequency determined in step e).

By averaging according to step c) and transforming according to step d), the contrast function as well as the maxima thereof is determined not via derivations, but via summation. The method according to the invention is therefore very robust with respect to unavoidable interferences such as e.g. noise or differences in illumination. Additional adaptation through parameters is therefore no longer required.

By means of step c) a data reduction to one dimension is virtually carried out by means of projection, which increases the robustness of the method according to the invention. Steps d) and e) then virtually effect a data reduction to one spectral component, whereby the robustness of the method according to the invention is further increased.

The method according to the invention for determining the position of an optical boundary surface along a first direction can also be characterized by the following steps:
 A) imaging a pattern in a plane transverse to the first direction, wherein the pattern varies periodically in the plane in a second direction, and recording an image of the pattern imaged in the plane,
 B) repeating step A) for different positions in the first direction, wherein the different positions cover an area in the first direction in which the optical boundary surface lies,
 C) reducing the data of each image from step A) to one dimension by means of projection,
 D) reducing the data produced in step C) to one spectral component which has the highest amplitude,
 E) determining the frequency of the spectral component from step D),
 F) determining the position along the first direction by evaluating the data according to step C) at the frequency determined in step E).

It is possible to replace a step denoted by an upper-case letter with the step named above with the same letter, but in lower case. And vice versa.

The pattern in step a) or A) can be provided such that it only varies periodically in the second direction. In step c) the averaging is preferably carried out in such a way that it only takes place along the direction in which the pattern does not vary and does not oscillate. The same applies to the projection in step C).

The averaging according to step c) can be carried out by means of a corresponding projection.

The pattern can be a strip grating. The pattern can basically have any periodic grating function along the second direction. The grating function can thus for example be a triangle function, a rectangle function, a sine function, etc.

Furthermore, a discrete Fourier transform can be carried out in step d) or D). This can, in particular, be a one-dimensional discrete Fourier transform. Of course, other transforms can also be carried out in step d) or D). For instance, transforms based on a cosine or sine transform or other suitable functional transforms can be carried out.

In step f) or F), a maximum may in particular be sought. In step f) or F), an approximation can thus be carried out using a cubic polynomial function or cubic splines. These have very good properties at the connection points as they can be differentiated twice there. This enables a very precise determination of zero points and extrema. Of course, the approximation in step f) or F) can also be carried out with other interpolants.

In particular in step f) or F), all spectral data produced in step d) or D) can be evaluated at the frequency determined in step e) or E).

Furthermore the optical boundary surface can be a boundary surface of a specimen slide and, in step f) or F), a spherical aberration caused by the specimen slide can be corrected. This leads to a further improvement in the measurement result.

With steps a)-f) or A)-F), the position of two optical boundary surfaces and from this the distance between the two optical boundary surfaces can be determined. In particular, from this the mechanical distance between the optical boundary surfaces can also be determined.

The optical boundary surface can thus in particular be an optical boundary surface of a specimen slide. The latter can, for example, be formed as a cover glass or as a Petri dish.

In step e) or E), the frequency can furthermore be determined by means of a parabolic fit. Very accurate results can thereby be achieved. Furthermore, it is possible in step e) or E) to determine the frequency by means of other interpolants.

In step c) or C), the direction transverse to the second direction can be determined with reference to the respective image. For this purpose, the averaging or the projection can, for example, be defined in a rotation-dependent manner, with the result that a lateral rotation of the pattern in the plane is contained as parameter or variable. The averaging or the rotation can then be evaluated in such a way that the direction transverse to the second direction is preferably perpendicular to the second direction. It is thus ensured that during the averaging or the projection no component along the second direction in which the pattern varies periodically is taken into consideration. Through this procedure, it can be ensured that non-optimal alignments of the pattern in step a) or A) can be compensated. This leads to better results in determining the position of the optical boundary surface.

The different positions according to step b) or B) can be equidistant from each other. However, it is also possible that the distances are not constant. In particular, the distance between the different positions according to step b) or B) can be smaller the closer they are to the position of the optical boundary surface.

In step a) or A), the pattern is preferably imaged magnified.

The disclosed methods can be used in reflected light or transmitted light microscopes.

The disclosure also includes a device for determining the position of an optical boundary surface along a first direction. The device includes an illuminating module for imaging a pattern in a plane transverse to the first direction, an imaging module for recording the pattern imaged in the plane and a control module which is designed to carry out the steps of the method according to the invention (including further developments thereof).

The device can, in particular, be formed as a microscope. The microscope can, for example, be formed as a reflected light microscope or transmitted light microscope.

It is understood that the features named above and those yet to be explained below can be used not only in the stated combinations but also in other combinations or alone, without departing from the scope of the present invention.

Figure 1:
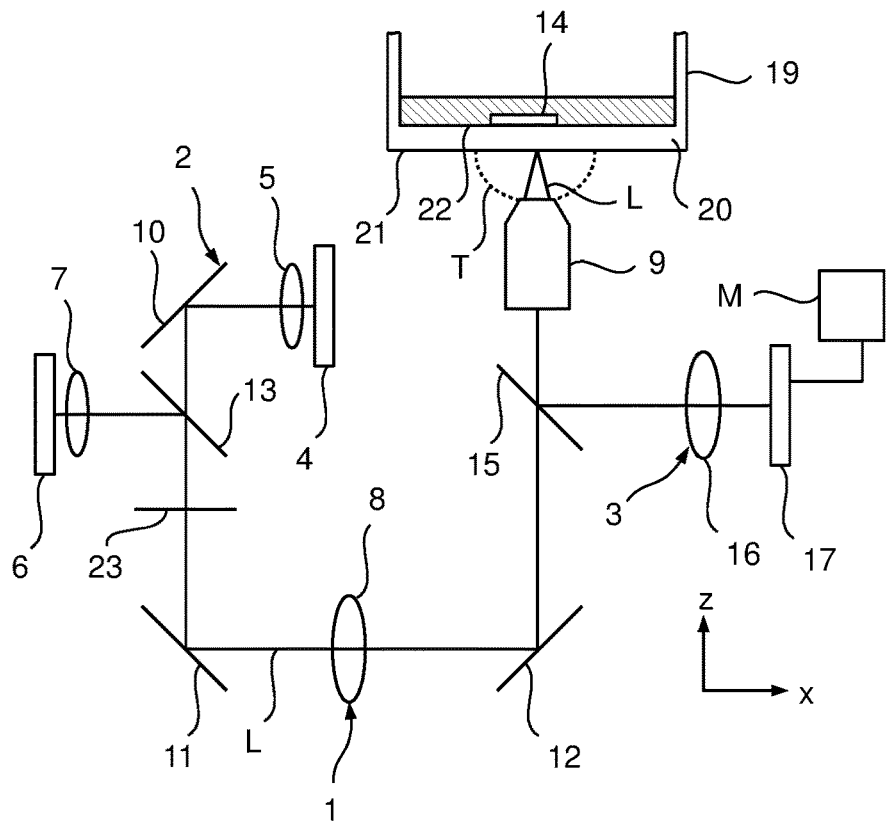
FIG. 1 is a schematic representation of the setup of an embodiment of the device according to the invention for determining the position of an optical boundary surface along a first direction.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

FIG. 1 shows schematically the setup of an embodiment of the device according to the invention for determining the position of an optical boundary surface along a first direction. In this embodiment, the device 1 is formed as an inverted reflected light microscope which comprises an illuminating module 2 and an imaging module 3.

The illuminating module 2 can comprise e.g. a first light source 4 with a first optical system 5, a second light source 6 with a second optical system 7, an illuminating optical system 8 and an objective 9.

The first light source 4 can, for example, emit light with a wavelength of 420 nm and the second light source 6 can, for example, emit light with a wavelength of 625 nm. In principle, light with a wavelength from the visible wavelength range, from the infrared range or from the UV range can be used.

Furthermore, deflecting mirrors 10, 11 and 12 and a beam combiner 13 are also provided, with the result that, preferably selectively, the light L from the first or second light source 4, 6 for the illuminating optical system 8 and the objective 9 can be directed for illumination onto a sample 14.

The imaging module 3 comprises the objective 9, a beam splitter 15, an imaging optical system 16 and a camera 17. A (preferably magnified) image of the sample 14 can thus be recorded via the objective 9, the beam splitter 15 and the imaging optical system 16 with the camera 17.

Furthermore, the device 1 also comprises a control module M which controls the device 1 during operation and carries out the determination of the position of the optical boundary surface described below. The control module M can be part of the device 1, can be formed as a separate module or a combination of the two.

Figure 2:
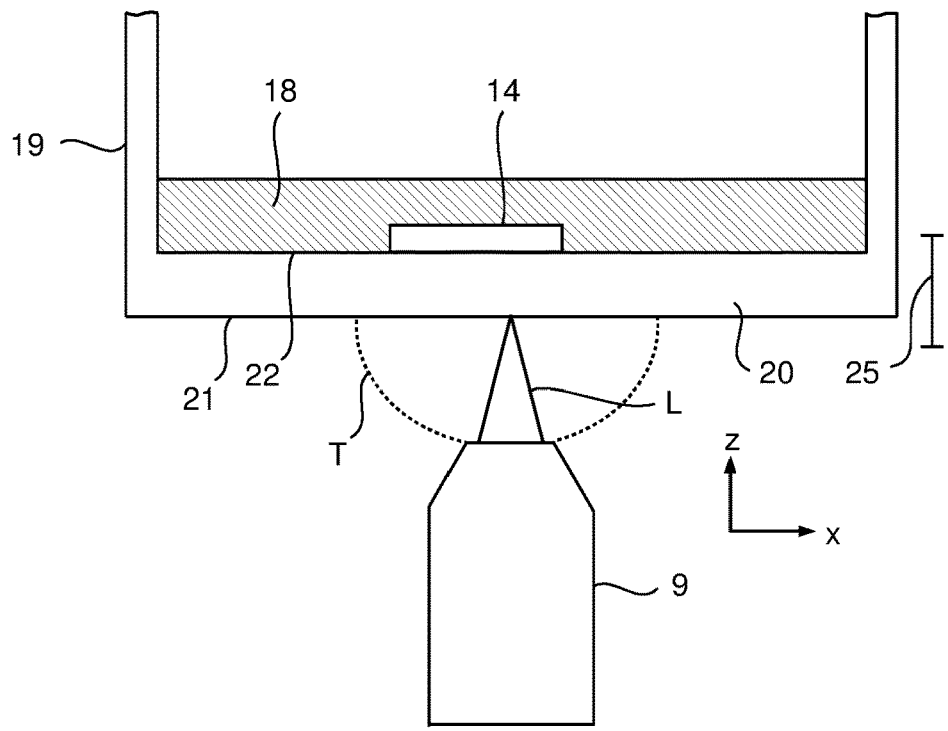
FIG. 2 is an enlarged representation of the objective and of the sample of the device from FIG. 1.

FIG. 2 shows an enlarged detail view of the objective 9 and of the sample 14. The sample 14 can be e.g. a cell sample which is floating in a liquid medium 18 which is held in a Petri dish 19. An immersion medium T may be present between a base 20 of the Petri dish 19 and the objective. For high-quality imaging, it may for example be necessary to determine the precise position of an upper boundary surface 22 of the base 20.

Figure 3:
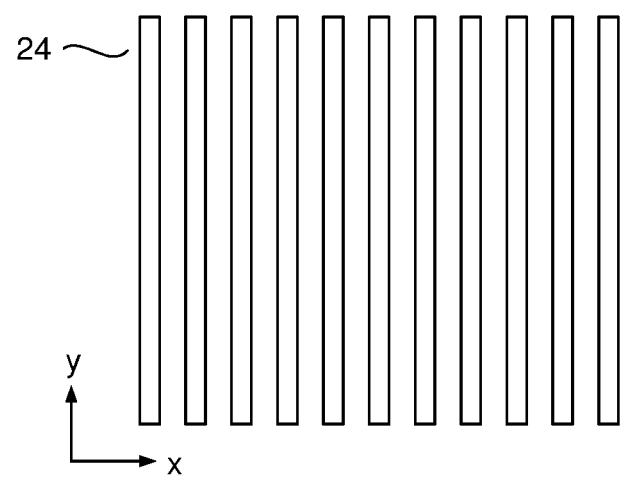
FIG. 3 is a schematic representation of the strip grating which is to be imaged in the focal plane.

For this purpose, a strip grating 24 (as is represented schematically in FIG. 3) is arranged in a plane 23 (FIG. 1) conjugate to the focal plane of the imaging module 3 within the illuminating module 2, with the result that a corresponding strip grating-shaped structured illumination is present in the focal plane. The structured illumination varies periodically in the x-direction, which can also be referred to as the second direction.

Several recordings are made with this illumination by means of the imaging module 3, wherein the recordings take place at different z-positions (the z-direction can also be referred to as the first direction). A so-called z-stack is thus recorded. The z-positions are chosen such that they cover a z-area 25 within which at least the upper boundary surface 22 lies. In the embodiment described here, the z-area 25 is chosen such that the lower boundary surface 21 of the base 20 of the Petri dish 19 also lies in the z-area 25.

As there is a jump in refractive index at the boundary surface 22, a reflection occurs here, whereas at other points inside or outside the base 20 a reflection does not occur, which can be used to determine the position of the upper boundary surface 22 along the first direction (in the z-direction) with great accuracy. Of course, it is also possible also to determine the position of the lower boundary surface 21 with great accuracy as, here too, there is a jump in refractive index. If the positions of the two boundary surfaces 21 and 22 are determined, the thickness of the base 20 of the Petri dish 19 can also be determined with great accuracy.

In the device 1 according to the invention, a predetermined z-area 25 is thus passed through (the focal plane is displaced in the z-direction), wherein there is always a sharp imaging of the strip grating 24 in the focal plane and thus the desired strip-shaped structured illumination. Passing through the predetermined z-area 25 can take place with equidistant steps, for example. However, it is also possible to vary the step width. In this way, for example, the possible position of the jump in refractive index can be located in large steps in order subsequently to achieve finer scanning around this area in smaller steps.

The structured illumination is carried out as it is known from reflected light brightfield microscopy that lateral planar objects, such as for example the reflection at a planar surface, cannot be resolved axially. The reason for this is that the optical transfer function (OTF) does not allow any axial spatial frequency components to pass through. It is therefore impossible to find the focal position of such a reflection. A fairly convenient solution to this problem is to introduce a lateral detail such as, e.g., a periodic grating from a conjugate illumination plane, like the plane 23. With the Fourier shift theorem, it can be shown that this modulation shifts the optical transfer function laterally in the grating direction such that henceforth axial zero frequency components can pass through.

As already mentioned, a reflection occurs at a boundary surface with a jump in refractive index or an abrupt change in the refractive index, which can be explained using the Huygens-Fresnel principle. The distance between two such reflections at the upper and lower boundary surfaces 21 and 22 does not yet, however, represent the possible thickness of the intermediary base. Derived from Snell's law, the actual thickness d of the base can be calculated from the measured distance $d_a$ according to equation 1:

$$d = d_a \frac{n_g}{n_i} \qquad (1)$$

$n_i$ is the refractive index of the immersion medium T and $n_g$ is the refractive index of the base 20. Strictly speaking, equation 1 is only effective in the absence of a spherical aberration. If it is assumed that the spherical aberration directly beneath the base 20 is corrected, this may generally not apply to the other side of the base 20. The additional focal displacement at this first reflection (reflection at the upper boundary surface 22) by the spherical aberration can be taken into consideration in the interests of smaller measurement errors. A further measurement error may be produced if the reflection of the second boundary surface 22 arises through an embedding medium, which is contrary to the optical design parameters. In order to eliminate measurement errors of this type, an exemplary approach is proposed which determines displacements of the focal positions caused by the spherical aberration.

The description of the mode of operation is facilitated using a mathematical model from structured illumination. The image formation (observation) on camera 17 follows:

$$g = h_d * f(h_I * s) \qquad (2)$$

g is the observation, f is the reflective surfaces, (*) is a convolution operator, $h_I$ is the PSF (point spread function) for the illumination and $h_d$ is the PSF for the detection. All quantities and operators are three-dimensional in the $\mathbb{R}$ domain. The quantity s is the incoherent, grating modulated intensity, which is represented here as a cosine function with the grating frequency $\Omega$ for simplification:

$$s(x,y,z) = \tfrac{1}{2}\delta(z-z_I)[1+\cos(\Omega x)] \qquad (3)$$

The special case of structured illumination, in which f is an axis-orthogonal plane, dictates that $f(x,y,z) = \delta(z-z_g)$ wherein $z_g$ is the focal position of the observation plane and $z_I$ is the focal position of the modulated illumination plane. If these two planes now do not fall in precisely the same location, we establish that only a weaker signal is observed and no additional errors in the measurement thereby occur. In the interests of a good signal-to-noise ratio (SNR), however, a parfocal adjustment should be carried out. Through the fact that f now represents an axial Dirac distribution, it can be learned from equation 2 that only the point spread function $h_d$ of the detection influences the observed intensities in the axial direction. In the presence of a spherical aberration, a noticeable displacement of the focal position may now arise.

For patterns as defined in equation 3, the detection signal-to-noise ratio can be improved considerably if the repeating structures are averaged. For this purpose, a projection along the y-coordinate is defined:

$$p(x,z) = \int_y g(x,y,z) dy = Y[1 + m_D(z-z_g)\cos \Omega x] \qquad (4)$$

$m_D(z) = c\int \cos \Omega x [\int h_D(x,y,z) dy] dx$ and c is a constant. It can be seen that, precisely at $z = z_g$, the amplitude in p reaches a maximum. Using the Fourier transform, it can be shown that it is possible because of the following proportionality to determine the unknown location $z_g$:

$$P(u,z) = Y[2\pi\delta(u) + m_D(z-z_g)\pi(\delta(u+\Omega) + \delta(u-\Omega))]\|$$
$$P(\pm\Omega, z)\| \sim m_D(z-z_g) \qquad (5)$$

The use of a discrete Fourier transform (DFT) has the advantage that only ±Ω components arise by means of summation and the signal-to-noise ratio is thus repeatedly improved significantly, which additionally increases the robustness of the algorithm.

Technical implementations often show that a precise alignment of the grating 24 cannot always be realized mechanically in order to be able to carry out the simple projection from the above equation 4 correctly. In order to take this into consideration, a rotation-dependent projection is defined as $$p_c(x, y; \varphi) = \frac{1}{Y}\sum_y g(R_\varphi(x, y)^T, z); \quad (6)$$

$$R_\varphi = \begin{pmatrix} \cos(\varphi) & -\sin(\varphi) \\ \sin(\varphi) & \cos(\varphi) \end{pmatrix}$$

and use the norm of the 1D Fourier transform via x at ±Ω as cost function in order to determine the lateral angle of rotation of the grating $\varphi$ by maximization:

$$\xi(\varphi) = \|FT\{(p_c(x, z_g, \varphi)\}(\pm\Omega) \to \max. \quad (7)$$

Working with discretely sampled data always necessitates an interpolation adapted to the expected measurement accuracy. In the embodiment described here, a piecewise approximation by means of a cubic polynomial function, as represented in equation 8, is used for this purpose. This thus brings the further advantage of finding the precise position of the sought peak or maximum through simple analytical expressions:

$$k(x) = U^i\{a_D^i + a_1^i x + a_2^i x^2 + a_3^i x^3\} \quad (8)$$

These types of approximation are likewise known by the name cubic splines. They have the outstanding property that they can be differentiated twice at the connection points. This enables a precise determination of zero points and extrema. The generation of the coefficients (at) will not be discussed in more detail here as it is sufficiently known to a person skilled in the art.

The work sequence of the method according to the invention for determining the position of an optical boundary surface along a first direction can be described as follows.

Figure 4:
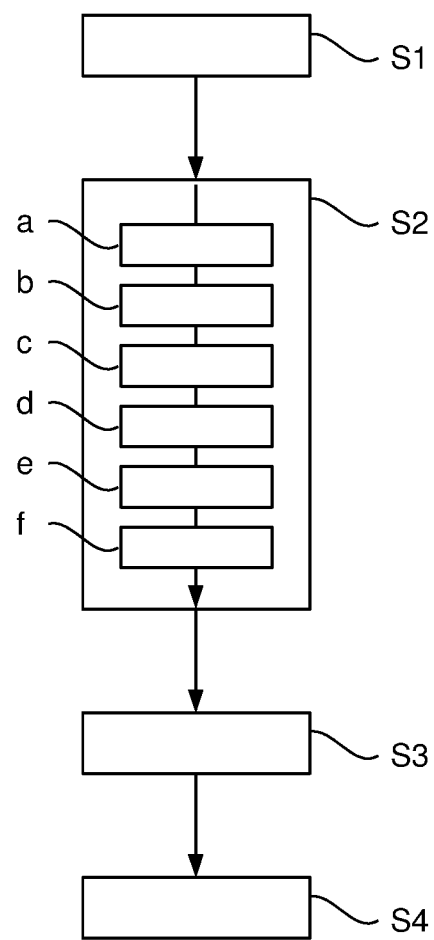
FIG. 4 is a flow diagram for a method in accordance with embodiments of the invention.

In step S1 (FIG. 4), the z-stack is recorded in the described manner. This can include the two boundary surfaces 21, 22. Alternatively, it is possible to record a first z-stack, which includes the upper boundary surface 22, and a second z-stack, which includes the lower boundary surface 21. Each recording from a z-plane (which can also be referred to as a z-slice) contains the precise z-position, e.g. of a sample stage on which the Petri dish 19 is positioned. The width of each z-stack should be at least 2-3 times the full width at half maximum (FWHM distance) in the axial direction. The scanning should not be coarser than half the axial resolution (Nyquist). Finer scanning is preferred.

In step S2, with approximately known rotation of the grating 24 (if it is a line grating, the preferred direction is horizontal), positions of the dominant reflections in the z-stack are sought as follows:

In sub-step a), all recorded z-slices are converted into a 2D array of z-x-positions using equation 6.

In sub-step b), each projection is then transformed via a one-dimensional discrete Fourier transform.

In the subsequent sub-step c), the spectral component of the greatest norm (greatest amplitude) that is different from the zero frequency is found according to the relationship of equation 5 along z and at this the precise grating frequency is determined via a parabolic fit. This is used later to find all maxima.

In optional sub-step d), a determination of the lateral angle of rotation of the grating 24 can now take place according to equation 7 if the given angle differs by approximately greater than ±10° from the expected angle. In this case, sub-steps a) and b) are then repeated with the correct angle. As this angle determination is time-consuming, it is advisable to use the angular value thus found upon repeated measurement in sub-step a) again and then to miss out sub-step b).

In sub-step e), the spectral data obtained from sub-step b) are evaluated at the point of the grating frequency found in sub-step c) for all z-spectra. Using cubic splines, all data henceforth are considered continuously. Along the optical axis (z-direction), all maxima of the spectrum norm with the respective position are found continuously via the derivations of the polynomials. In the case of z-stacks divided up in step S1, the use of a simple low-pass filter before the derivation can help to reduce discontinuous discrete jumps at the transitions of these z-stacks. Error detections at these transitions can thus be avoided. In the case of a continuous z-stack, this measure is unnecessary.

In sub-step f), the positions of the desired N boundary surfaces can be obtained from a sorting step. With a generally known number of N, entries higher than actually present maxima can be seen after the sorting, but these pseudo maxima can be disregarded. N is an integer which is greater than or equal to 1.

In step S3, the distances are now in units of continuous stage coordinates. Using equation 1 and known refractive indices, the mechanical distance can be calculated therefrom.

In optional step S4, a correction of the spherical aberration can be effected, e.g. using the Gibson-Lanni model (Gibson, Lanni, 1992, Experimental Test of an Analytical Model of Aberration in an Oil-Immersion Objective Lens used in three Dimensional Light Microscopy, JOSA, 9 (1), 154 et seq.).

This model determines the optical path lengths geometrically through three different optical media, which leads to a pupil function. Here, the three optical media are the sample 14, the base 20 and the immersion medium T. Using this model, the axial displacement of the focal position can be obtained from the calculation of the point spread function. In order to determine the displacement of the plane closest to the objective 9, we change the Gibson-Lanni model to a 2-layer model. In order to make this possible and with the assumption that the refractive indices of the immersion medium T and the sample 14 are approximately the same, the thickness of the base 20 modulated there can be set to zero. If a point spread function is now calculated along the lateral central line in the axial direction (also often referred to as a line spread function), the displacement of the overall maximum is approximately equal to the measurement error to be expected. This then merely has to be added to the result determined previously.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. A method for determining a position of an optical boundary surface along a first direction, the method comprising:
   a) imaging a pattern in a plane transverse to the first direction, wherein the pattern varies periodically in the plane in a second direction;
   b) recording a two-dimensional image of the pattern imaged in the plane transverse to the first direction;
   c) repeating step b) for a plurality of different positions in the first direction, wherein the plurality of different positions cover an area in the first direction in which the optical boundary surface lies;
   d) averaging each image from step b) along a direction transverse to the second direction such that in each case a one-dimensional data set is produced;
   e) transforming each data set from step d) into a frequency domain;
   f) determining the frequency of the greatest amplitude of all data sets transformed in step e); and
   g) determining the position of the optical boundary surface along the first direction by evaluating the data sets transformed in step e) at the frequency determined in step f).

2. The method according to claim 1, wherein the pattern in step a) only varies periodically in the second direction.

3. The method according to claim 1, wherein the pattern in step a) is a strip grating.

4. The method according to claim 1, wherein, in step e), a discrete Fourier transform is performed.

5. The method according to claim 4, wherein, in step g), an approximation is performed using a cubic polynomial function.

6. The method according to claim 1, wherein, in step g), an approximation is performed using a cubic polynomial function.

7. The method according to claim 1, wherein the optical boundary surface is a boundary surface of a specimen slide and, in step g), a spherical aberration caused by the specimen slide is corrected.

8. The method according to claim 1, wherein, with steps b) g), the position of two optical boundary surfaces, and from this the distance between the two optical boundary surfaces, is determined.

9. The method according to claim 1, wherein, in step f), the frequency is determined via a parabolic fit.

10. The method according to claim 1, wherein, in step d), the direction transverse to the second direction is determined with reference to the respective image.

11. A device for determining the position of an optical boundary surface along a first direction, comprising:
   an illuminating module for imaging a pattern in a plane transverse to the first direction;
   an imaging module for recording the image of the pattern imaged in the plane; and
   a controller which is configured to perform at least the following steps:
      a) imaging the pattern in the plane transverse to the first direction, wherein the pattern varies periodically in the plane in a second direction;
      b) recording a two-dimensional image of the pattern imaged in the plane transverse to the first direction;
      c) repeating step b) for a plurality of different positions in the first direction, wherein the plurality of different positions cover an area in the first direction in which the optical boundary surface lies;
      d) averaging each image from step c) along a direction transverse to the second direction such that in each case a one-dimensional data set is produced;
      e) transforming each data set from step d) into a frequency domain;
      f) determining the frequency of the greatest amplitude of all data sets transformed in step e); and
      g) determining the position of the optical boundary surface along the first direction by evaluating the data sets transformed in step e) at the frequency determined in step f).

12. A device for determining the position of an optical boundary surface along a first direction, comprising:
   an optics that images a pattern in a plane transverse to the first direction;
   a camera to record the image of the pattern imaged in the plane; and
   a controller that is configured to perform the following steps:
      a) imaging the pattern in the plane transverse to the first direction, wherein the pattern varies periodically in the plane in a second direction;
      b) recording a two-dimensional image of the pattern imaged in the plane transverse to the first direction;
      c) repeating step b) for a plurality of different positions in the first direction, wherein the plurality of different positions cover an area in the first direction in which the optical boundary surface lies;
      d) averaging each image from step c) along a direction transverse to the second direction such that in each case a one-dimensional data set is produced;
      e) transforming each data set from step d) into a frequency domain;
      f) determining the frequency of the greatest amplitude of all data sets transformed in step e); and
      g) determining the position of the optical boundary surface along the first direction by evaluating the data sets transformed in step e) at the frequency determined in step f).

13. The device of claim 12, wherein the optics is disposed in an imaging pathway between the pattern and an objective of a microscope.

14. The method according to claim 1, wherein prior to step a), the method comprises placing the pattern in an imaging pathway such that an optics for imaging is disposed between the pattern and an objective of a microscope.

15. The device of claim 11, wherein the illumination module is disposed in an imaging pathway between the pattern and an objective of a microscope.

* * * * *

UNITED STATES PATENT AND TRADEMARK OFFICE
CERTIFICATE OF CORRECTION

PATENT NO. : 10,832,385 B2
APPLICATION NO. : 15/650837
DATED : November 10, 2020
INVENTOR(S) : Lutz Schaefer It is certified that error appears in the above-identified patent and that said Letters Patent is hereby corrected as shown below:

In the Specification

Column 6, Line 36: Delete "frequency $\Omega$ for simplification:"
And replace with -- frequency $\omega$ for simplification: --

Equation 3: Delete "$s(x,y,z)=\frac{1}{2}\delta(z-z_I)[1+\cos(\Omega x)]$"
And replace with --
$$s(x, y, z) = \frac{1}{2}\delta(z - z_I)[1 + \cos(\omega x)]$$
--

Equation 4: Delete "$p(x,z)=\int_Y g(x,y,z)dy=Y[1+m_D(z-z_g)\cos\Omega x]$"
And replace with --
$$p(x, z) = \int_Y g(x, y, z)\,dy = Y[1 + m_D(z - z_g)\cos\omega x]$$
--

Column 6, Line 60: Delete "$m_D(z)=c\int\cos\Omega x[\int h_D(x, y, z)dy]dx$"
And replace with -- $m_D(z) = c \int \cos\omega x [\int h_D(x, y, z)\,dy]\,dx$ --

Equation 5: Delete
"$P(u,z)=Y[2\pi\delta(u)+m_D(z-z_g)\pi(\delta(u+\Omega)+\delta(u-\Omega))]$
$\|P(\pm\Omega,z)\| \sim m_D(z-z_g)$"

And replace with --
$$P(u, z) = Y[2\pi\delta(u) + m_D(z - z_g)\pi(\delta(u + \omega) + \delta(u - \omega))]$$
$$\|P(\pm\omega, z)\| \sim m_D(z - z_g)$$
--

Column 7, Line 2: Delete "$\pm\Omega$"
And replace with -- $\pm \omega$ --

Signed and Sealed this
Fourth Day of October, 2022

*Katherine Kelly Vidal*

Katherine Kelly Vidal
*Director of the United States Patent and Trademark Office*

CERTIFICATE OF CORRECTION (continued)
U.S. Pat. No. 10,832,385 B2

Equation 6: Delete "$p_c(x, y; \varphi) = \frac{1}{Y} \sum_y g(R_\varphi(x, y)^T, z);$ $R_\varphi = \begin{pmatrix} \cos(\varphi) & -\sin(\varphi) \\ \sin(\varphi) & \cos(\varphi) \end{pmatrix}$,"

And replace with -- $p_c(x, y; \varphi) = \frac{1}{Y} \sum_y g(R_\varphi(x,y)^T, z); \quad R_\varphi = \begin{pmatrix} \cos(\varphi) & -\sin(\varphi) \\ \sin(\varphi) & \cos(\varphi) \end{pmatrix}$ --

Column 7, Line 20: Delete "±Ω"
And replace with -- ± ω --

Equation 7: Delete "$\xi(\varphi) = \|FT\{p_c(x, z_g, \varphi)\}(\pm\Omega)\| \to max.$,"

And replace with -- $\xi(\varphi) = \|FT\{p_c(x, z_g, \varphi)\}(\pm\omega)\| \to max.$ --

Equation 8: Delete "$k(x) = U^i\{a_0{}^i + a_1{}^i x + a_2{}^i x^2 + a_3{}^i x^3\}$"

And replace with -- $k(x) = U^i\{a_0^i + a_1^i x + a_2^i x^2 + a_3^i x^3\}$ --

Column 7, Line 39: Delete "(at)"
And replace with -- ($a^i$) --

In the Claims

Claim 8: Delete "steps b) g),"
And replace with -- steps b) – g), --